UNITED STATES PATENT OFFICE.

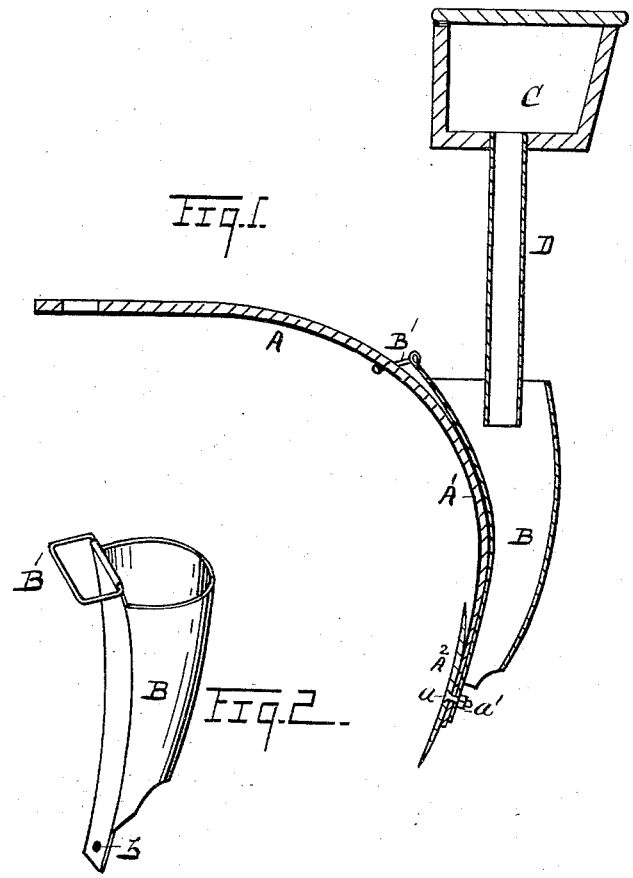

PHILIP R. WELLS, OF DETROIT, MICHIGAN.

SPRING-HOE FOR SEED-DRILLS.

SPECIFICATION forming part of Letters Patent No. 474,430, dated May 10, 1892.

Application filed November 20, 1891. Serial No. 412,495. (No model.)

*To all whom it may concern:*

Be it known that I, PHILIP R. WELLS, a citizen of the United States, residing at Detroit, county of Wayne, State of Michigan, have invented a certain new and useful Improvement in Spring-Hoes for Seed or Fertilizer Drills; and I declare the following to be a full, clear, and exact description of the invention, such as will enable others skilled in the art to which it appertains to make and use the same, reference being had to the accompanying drawings, which form a part of this specification.

My invention relates to certain new and useful improvements in a spring-hoe for seed or fertilizer drills; and it consists of the combination of devices and appliances hereinafter specified and claimed, and illustrated in the accompanying drawings, in which—

Figure 1 is a vertical section embodying my invention, and Fig. 2 is a separate view of the tube.

The object of my invention is to provide a spring-hoe for drills, said hoe consisting of a spring-tooth and a tube attached thereto, allowing to the tooth its full spring, the construction and arrangement being simple, economical, and efficient.

I carry out my invention as follows: A in the drawings represents a spring-tooth. The tooth shown herewith is constructed with a curved spring-standard A', provided with a reversible point A², united to said standard by a bolt $a$ and a nut $a'$. I would have it definitely understood, however, that I do not limit myself in my invention to a spring-tooth of this particular construction alone, as my invention contemplates the employment of various constructions of the spring-tooth as coming within its scope.

B denotes a tube attached to the rear of the spring-tooth in any proper or desired manner, preferably, as already referred to, in such a manner as to allow the tooth to retain its full spring. As shown, the tube is provided with a loop B' at its upper end, through which may be passed the standard of the spring-tooth. At the lower end the tube is shown provided with an orifice $b$, and at said end is attached to the tooth by means of the bolt $a$ and nut $a'$ used to engage the point to the standard, as represented in Fig. 1. The lower end of the tube is thus held in firm engagement with the tooth, while at the upper end the engagement of the tube with the standard is free, allowing the standard to spring freely. I do not, however, limit myself solely to this manner of attaching the tube to the tooth, as my invention contemplates any desired method of uniting the one to the other.

C denotes a seed or fertilizer box, and D a flexible tube leading from the box C to the tube B. It will be observed that the tubes B may readily be attached to the spring-tooth with but little time and labor. Thus I am enabled to use a regular spring-tooth cultivator as a drill by putting a seed-box onto the cultivator and applying the tubes B to the spring-teeth thereof. It is also obvious that the tubes B may be readily removed from the spring-teeth and the machine be used simply as a cultivator or harrow. Thus by means of my invention the same machine may be readily and conveniently converted from a cultivator or harrow into a seed or fertilizer drill, and vice versa. These tubes, as will thus be seen, are attached to the spring-teeth used upon various regular spring-teeth cultivators. It will be seen that the tubes B are not for the purpose of carrying the grain or fertilizer, as that office is performed entirely by the box C. Hence the tube B may be permanently open at both ends, no regulating device being required in connection therewith to control the quantity of seed or fertilizer delivered therethrough. The tube B is designed as a conductor to properly direct and deliver the seed or fertilizer conveyed thereto through the tube D from the box C and serves as a protector and guide to the tube D rather than to contain and scatter the seed.

Therefore what I claim as my invention is—

1. In combination, a spring-tooth and a conducting-tube engaged with said tooth, said tooth free to spring independently of the tube, substantially as described.

2. In combination, a spring-tooth and a conducting-tube united to said tooth, said tooth and tube having a movable relation the one to the other at the upper end of the tube, substantially as described.

3. In combination, a spring-tooth and a conducting-tube firmly united to the tooth toward its lower end, the tube and tooth having a movable relation the one to the other at the upper end of the tube, substantially as described.

4. In combination, a spring-tooth and a conducting-tube firmly united to the tooth at its lower end, said tube provided toward its upper end with a loop B' and said tooth passed through said loop, substantially as described.

5. In a seed or fertilizer drill, the combination of a spring-tooth, a conducting-tube engaged therewith, a seed or fertilizer box C, and a tube leading from said box to the conducting-tube, substantially as described.

In testimony whereof I sign this specification in the presence of two witnesses.

PHILIP R. WELLS.

Witnesses:
N. S. WRIGHT,
H. W. COWDERY.